US009049202B2

(12) United States Patent
Torres

(10) Patent No.: US 9,049,202 B2
(45) Date of Patent: Jun. 2, 2015

(54) EMBEDDING USER EQUIPMENT INFORMATION WITHIN THIRD PARTY REGISTRATION MESSAGES

(75) Inventor: Jose Miguel Torres, Madrid (ES)

(73) Assignee: Google Technology Holdings LLC, Mountain View, CA (US)

( * ) Notice: Subject to any disclaimer, the term of this patent is extended or adjusted under 35 U.S.C. 154(b) by 1704 days.

(21) Appl. No.: 11/772,317

(22) Filed: Jul. 2, 2007

(65) Prior Publication Data

US 2009/0011763 A1    Jan. 8, 2009

(51) Int. Cl.
*H04W 4/00* (2009.01)
*H04L 29/06* (2006.01)
*H04L 29/08* (2006.01)
*H04W 60/04* (2009.01)
*H04W 60/00* (2009.01)
*H04W 48/18* (2009.01)

(52) U.S. Cl.
CPC ........... *H04L 65/1016* (2013.01); *H04W 60/04* (2013.01); *H04W 60/00* (2013.01); *H04W 48/18* (2013.01); *H04L 65/1073* (2013.01); *H04L 67/306* (2013.01)

(58) Field of Classification Search
CPC ........... H04L 65/1016; H04L 65/4076; H04N 21/25825; H04N 21/25858; H04N 21/2662; H04N 21/4436; H04N 21/64322; H04N 21/658; H04N 21/6582
USPC ............. 455/435.1, 435.2, 426.1, 556.1, 434, 455/509; 370/338, 329, 331; 701/36
See application file for complete search history.

(56) References Cited

U.S. PATENT DOCUMENTS 7,149,506 B2 * 12/2006 Osterhout et al. ............ 455/417
7,444,148 B1 * 10/2008 Cook .......................... 455/435.1

(Continued)

FOREIGN PATENT DOCUMENTS

EP           1720320 B1    11/2008
KR    1020050053084 A      6/2005

(Continued)

OTHER PUBLICATIONS

3GPP TS 24.229 v6.9.0 (2005-2012), 3rd Generation Partnership Project; Technical Specification Group Core Network and Terminals; IP Multimedia Call Control Protocol based on Session Initiation Protocol (SIP) and Session Description Protocol (SDP); Stage 3 (Release 6), Sections 5.4.1.7 and 7.6, pp. 65-66 and 98-99.

*Primary Examiner* — Mahendra Patel
(74) *Attorney, Agent, or Firm* — Fish & Richardson P.C.

(57) ABSTRACT

A method, information processing system, and wireless communications system for providing dynamic information associated with at least one of a wireless device and a network to at least one application server. The method includes receiving a registration message (604) associated with a wireless device (106). A service profile (220) associated with the wireless device (106) is retrieved from a register (212). The service profile (220) is determined to indicate dynamic information associated with at least one of a wireless device (106) and a network requested by at least one application server (218) associated with the wireless device (106). A third-party registration message that includes at least the dynamic information requested by the at least one application serve (218) is generated (612). The third-party registration message is sent (614) to the at least one application server (218).

11 Claims, 7 Drawing Sheets

(56) References Cited

U.S. PATENT DOCUMENTS

| | | | |
|---|---|---|---|
| 7,613,705 B2* | 11/2009 | Ayers et al. | 1/1 |
| 8,249,090 B2* | 8/2012 | Mizukoshi | 370/432 |
| 8,655,357 B1* | 2/2014 | Gazzard et al. | 455/435.1 |
| 2005/0065801 A1 | 3/2005 | Poikselka et al. | |
| 2006/0105766 A1* | 5/2006 | Azada et al. | 455/432.1 |
| 2006/0135160 A1* | 6/2006 | Jiang | 455/435.1 |
| 2006/0193461 A1* | 8/2006 | Gavillet et al. | 379/221.13 |
| 2006/0253538 A1 | 11/2006 | Jung et al. | |
| 2007/0067470 A1* | 3/2007 | Ayers et al. | 709/230 |
| 2007/0183411 A1* | 8/2007 | Song et al. | 370/352 |
| 2007/0189301 A1* | 8/2007 | Kiss et al. | 370/395.2 |
| 2008/0057904 A1* | 3/2008 | Pousti | 455/406 |
| 2008/0070570 A1* | 3/2008 | Jiang | 455/433 |
| 2008/0167035 A1* | 7/2008 | Buckley et al. | 455/435.1 |
| 2008/0182575 A1* | 7/2008 | Torres et al. | 455/435.1 |
| 2008/0195535 A1* | 8/2008 | Liu | 705/39 |
| 2010/0011401 A1* | 1/2010 | Peng et al. | 725/116 |

FOREIGN PATENT DOCUMENTS

| | | |
|---|---|---|
| KR | 1020070036847 A | 4/2007 |
| WO | 2005018201 A | 2/2005 |
| WO | 2005018201 A1 | 2/2005 |

* cited by examiner

EMBEDDING USER EQUIPMENT INFORMATION WITHIN THIRD PARTY REGISTRATION MESSAGES

FIELD OF THE INVENTION

The present invention generally relates to the field of wireless communications, and more particularly relates to providing information associated with user equipment to application servers within an Internet Protocol ("IP") Multimedia Subsystem Network.

BACKGROUND OF THE INVENTION

Many current wireless communications systems are providing fixed and mobile multimedia services to their subscribers by implementing an IP multimedia subsystem ("IMS"). IMS allows a home network to provide its subscribers services independent of the subscribers' location and access technology. One of the IMS functions is to take care of registrations for all services. A wireless device registers with the IMS network by conveying a REGISTER message to a Serving Call Session Control Function ("S-CSCF") that performs session control. In response to receiving the REGISTER message from the wireless device, the S-CSCF builds up a new REGISTER message. This new REGISTER message also is referred to as third party registration. The S-CSCF conveys the third party registration to an Application Server ("AS"). The third party registration notifies the AS of the registration status of the wireless device.

One problem with current IMS networks is that not all of the information received by the S-CSCF in the REGISTER message from the wireless device is included in the third party registration message. Therefore, an AS does not receive all relevant information associated with a wireless device. Information such as P-access-network-id, User-Agent, and the like that is not received by the AS in the third party registration message could be needed by the AS in order to provide proper services to the wireless device.

Therefore a need exists to overcome the problems with the prior art as discussed above.

SUMMARY OF THE INVENTION

Briefly, in accordance with the present invention, disclosed are a method, information processing system, and wireless communications system for providing dynamic information associated with at least one of a wireless device and a network to at least one application server. The method includes receiving a registration message associated with a wireless device. A service profile associated with the wireless device is retrieved from a register. The service profile is determined to indicate dynamic information associated with at least one of a wireless device and a network and is requested by at least one application server associated with the wireless device. A third-party registration message that includes at least the dynamic information requested by the at least one application server is generated. The third-party registration message is sent to the at least one application server.

In another embodiment, an information processing system for providing dynamic information associated with at least one of a wireless device and a network to at least one application server is disclosed. The information processing system includes a memory and a processor that is communicatively coupled to the memory. The memory includes a Serving Call Session Control Function module. The Serving Call Session Control Function module is adapted to receive a registration message associated with a wireless device, retrieve a service profile associated with the wireless device from a register, determine that the service profile indicates dynamic information associated with at least one of a wireless device and a network and is requested by at least one application server associated with the wireless device, generate a third-party registration message that includes at least the dynamic information requested by the at least one application server and send the third-party registration message to the at least one application server.

In yet another embodiment, a wireless communication system is disclosed. The wireless communication system includes a base station and a wireless communications device. The wireless device is communicatively coupled to the base station. The wireless communications system also includes an Internet Protocol Multimedia Subsystem network comprising at least one information processing system. The information processing system includes a Serving Call Session Control Function module that is adapted to receive a registration message associated with a wireless device, retrieve a service profile associated with the wireless device from a register determine that the service profile indicates dynamic information associated with at least one of a wireless device and a network and is requested by at least one application server associated with the wireless device, generate a third-party registration message that includes at least the dynamic information requested by the at least one application serve, and send the third-party registration message to the at least one application server.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

Figure 1:
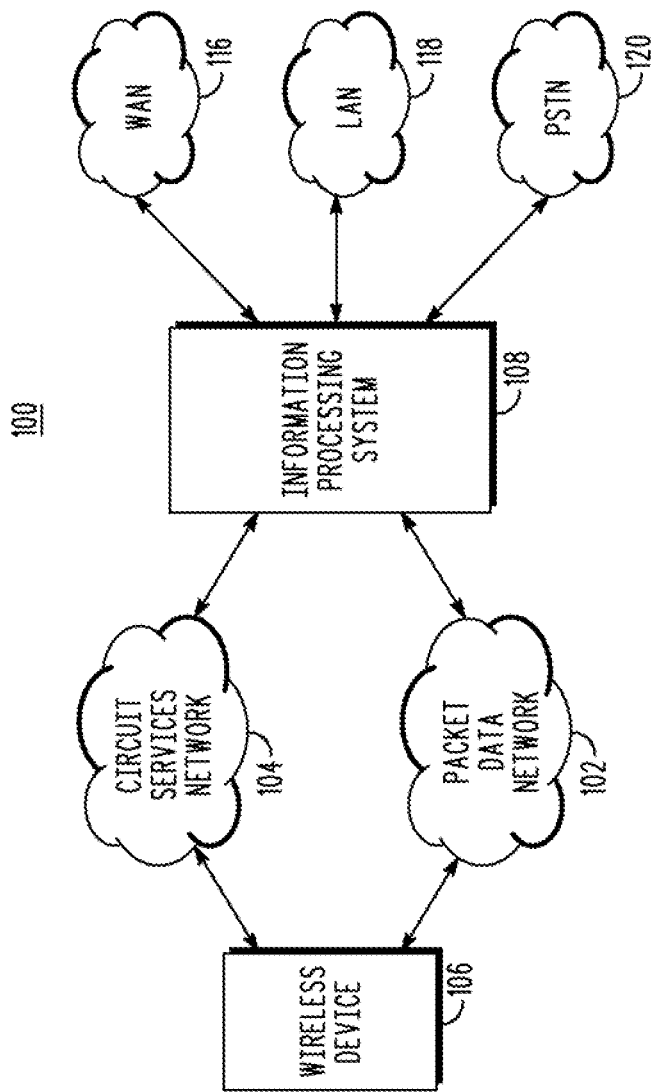
FIG. 1 is block diagram illustrating a wireless communication system according to an embodiment of the present invention.

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The term wireless device is intended to broadly cover many different types of devices that can wirelessly transmit signals, and optionally can wirelessly receive signals, and may also operate in a wireless communication system. For example, and not for any limitation, a wireless device can include any one or a combination of the following: a cellular telephone, a mobile phone, a smartphone, a two-way radio, a two-way pager, a wireless messaging device, a laptop/computer, automotive gateway, residential gateway, and the like. A multi-mode wireless device is intended to broadly cover any wireless device that can communicate using more than one communication service such as PTT/PoC, cellular, Voice Over IP ("VoIP"), data packet transfer, or the same type of communication service but on different networks. In various wireless technologies, the wireless device also may be referred to as a mobile station ("MS"), a user equipment ("UE"), or an access terminal ("AT"), among other terminologies.

An advantage of the foregoing embodiments of the present invention is that an application server can indicate to a Serving Call Session Control Function ("S-CSCF") the dynamic information it requires from the original REGISTER message sent by a particular wireless device. The application server can determine what information it requires and store this request at a register such as a Home Subscriber Server ("HSS"). The present invention allows for dynamic information such as wireless device capabilities, wireless device status, network status, network capabilities, and the like to be requested by and transmitted to an application server. Current Internet Protocol Multimedia Subsystems ("IMS") systems only allow for predefined static information stored at a HSS to be sent to an application server. The present invention, however, allows for the dynamic information provided by a wireless device to be sent to an application server via a third party registration messaging protocol.

Exemplary Wireless Communications System

Figure 2:
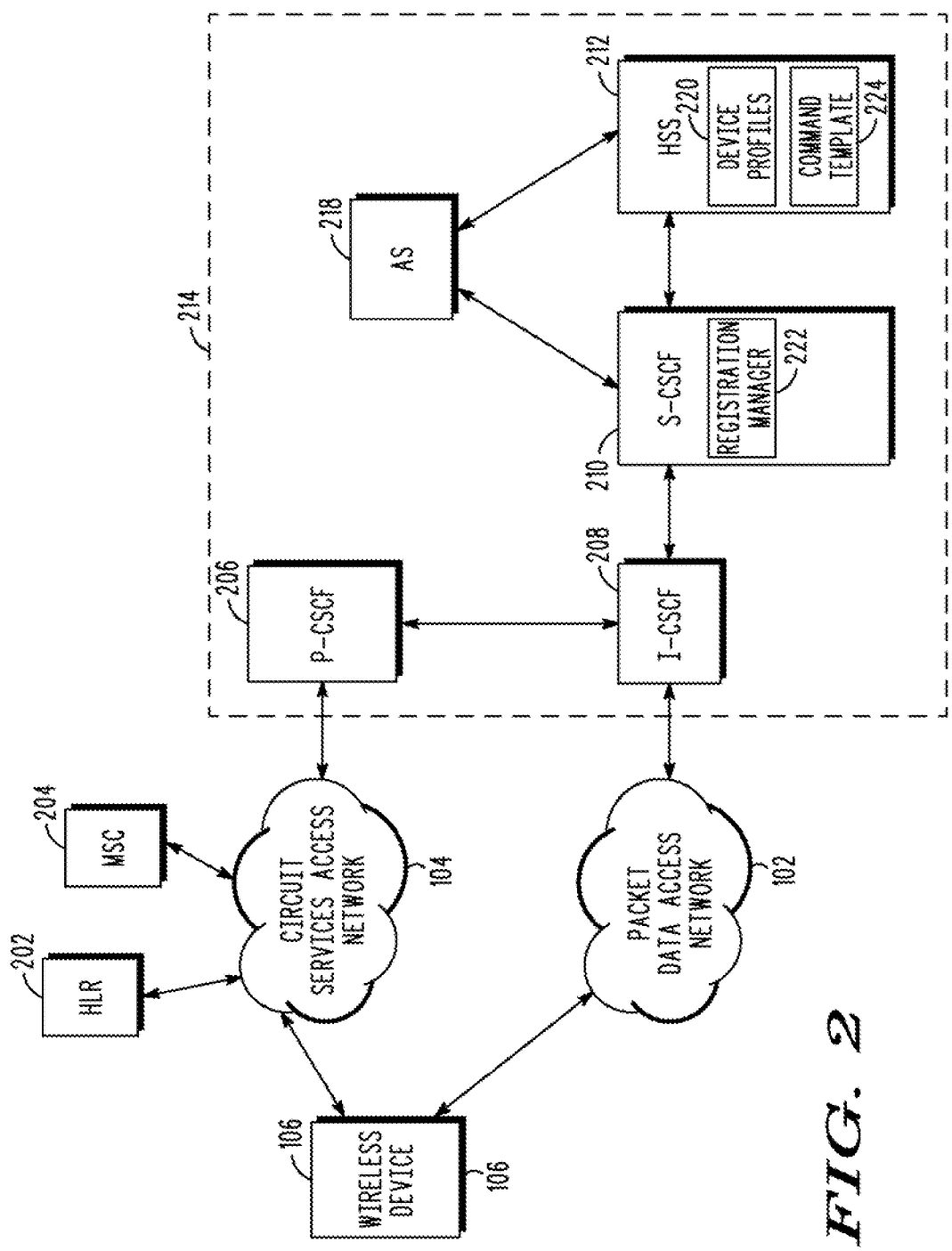
FIG. 2 is a block diagram illustrating a more detailed view of the wireless communication system of FIG. 1 according to an embodiment of the present invention.

According to an embodiment of the present invention, as shown in FIG. 1, an exemplary wireless communication system 100 is illustrated. The wireless communications system 100 includes a packet data network 102 and a circuit services network 104 that each connect a wireless device 106 to an information processing system 108. Each of these networks 102, 104 comprises one or more base stations (not shown) for providing wireless services to one or more wireless devices serviced by the network and is coupled to an IMS subsystem as discussed below with respect to FIG. 2. It should be noted that the packet data network 102 and the circuit services network 104 can be in separate systems as shown in FIG. 2, where one network is the home network of the wireless device 106 and the other network is a visited network. Also, in one embodiment, the wireless communications system 100 only includes one of the packet data network 102 and the circuit services network 104.

In one embodiment, the packet data network 102 is an Internet Protocol ("IP") connectivity network, which provides data connections at much higher transfer rates than a traditional circuit services network. The packet data network 102, in various embodiments, may comprise an Evolution Data Only ("EV-DO") network, a General Packet Radio Service ("GPRS") network, a Universal Mobile Telecommunications System ("UMTS") network, an 802.11 network, an 802.16 (WiMax) network, Ethernet connectivity, dial-up modem connectivity, or the like.

The circuit services network 104, in one embodiment, provides, among other things, voice services to the wireless device 106. The packet data network 102 and the circuit services network 104 can each comprise a mobile text messaging device network, a pager network, or the like. Text messaging standards such as Short Message Service ("SMS"), Enhanced Messaging Service ("EMS"), Multimedia Messaging Service ("MMS"), and the like are also included in the networks 102, 104.

Further, in various embodiments, the communications standard of the packet data network 102 and the circuit services network 104 may comprise Code Division Multiple Access ("CDMA"), Time Division Multiple Access ("TDMA"), Global System for Mobile Communications ("GSM"), General Packet Radio Service ("GPRS"), Frequency Division Multiple Access ("FDMA"), Orthogonal Frequency Division Multiplexing ("OFDM"), or the like. The networks 102, 104 also allow for push-to-talk over cellular communications between capable wireless devices.

The packet data network 102 and the circuit services network 104 support any number of wireless devices 106, which can be either single mode or multi-mode devices. The support of the networks 102, 104 includes support for mobile telephones, smart phones, text messaging devices, handheld computers, wireless communication cards, pagers, beepers, or the like. A smart phone is a combination of 1) a pocket PC, handheld PC, palm top PC, or Personal Digital Assistant ("PDA"), and 2) a mobile telephone. More generally, a smartphone can be a mobile telephone that has additional application processing capabilities.

The wireless communication system 100 also includes an information processing system 108 that maintains and controls the packet data network 102 and the circuit services network 104. Additionally, the information processing system 108 communicatively couples the wireless device 106 to a wide area network 116, a local area network 118, and a public switched telephone network 120 through the packet data network 102 and the circuit services network 104. Each of these networks 116, 118, 120 has the capability of sending data, for example, a multimedia text message to the wireless devices 106.

Exemplary System for Embedding Wireless Device Information within Third Party Registration Messages FIG. 2 is a block diagram showing a more detail view of the wireless communication system 100 of FIG. 1. It should be noted that FIGS. 1 and 2 are only illustrative examples and do not limit the present invention in any way. The present invention is applicable to any wireless communication system configuration where a wireless device 106 is accessing an IMS network.

As described above, the wireless communication system 100 comprises one or more wireless devices 106 that are communicatively coupled to the packet data network 102 and the circuit services network 104. In the example of FIG. 2, the wireless device 106 is trying to access an IMS network 214. The wireless device 106 can be within its home network or roaming within a visited network. For example, the home network of the wireless device 106 can be the packet services network 102 and the visited network can be the circuit services network 104, or vice versa. The present invention is not limited to any particular home/visited network configuration, only that a wireless device 106 is trying to access an IMS network.

IMS is a Next Generation Networking architecture for mobile and fixed Internet Protocol ("IP") services. IMS uses a Voice-over-IP implementation and runs over the standard IP. The wireless device 106 can connect to the IMS network using different methods, which all use standard IP. For example, when a wireless device 106 wants to access the packet data network 102, the wireless device 106 registers with the IMS network. The basic functions of an IMS network should be known to those or ordinary skill in the art.

The IMS network 214 includes a Proxy Call Session Control Function ("P-CSCF") 206. The P-CSCF 206 is communicatively coupled to an -Interrogating Call Session Control Function ("I-CSCF") 208 within the IMS network 214. The I-CSCF 208 is communicatively coupled to an S-CSCF 210 and, via the S-CSCF, to a register such as an HSS 212. It should be noted that other components reside within the IMS network 214 as should be known to those of ordinary skill in the art. In one embodiment the P-CSCF 206, I-CSCF 208, S-CSCF 210, and HSS 212 are part of a session initiation protocol ("SIP") network. The SIP network is used for establishing instant messaging, telephone calls, and other real-time communications over the Internet. The SIP network allows for IP telephony services to be integrated in a wireless communication system.

The HSS 212 comprises a database including profiles associated with each wireless device, such as a service profile 220 associated with the wireless device 106, registered with the IMS 214. A service profile includes, for example, subscription-related information. The HSS 210 also performs authentication and authorization of each such wireless device. The HSS 212 also provides information about a physical location of each such wireless device to requesting entities. The HSS 212 also includes information to identify each registered wireless device such as a telephone uniform resource identifier ("tel-URI") and/or a SIP uniform resource identifier ("SIP-URI"). A tel-URI, for example is the telephone number assigned to the wireless device 106. Each of the P-CSCF 206, the I-CSCF 208, and the S-CSCF 210 supports SIP signaling and can process SIP signaling packets in the IMS network 214.

The P-CSCF 206 is the first contact point for a wireless device 106 registered in the IMS network. In one embodiment, the wireless device 106 locates its respective P-CSCF 206 via a dynamic host configuration protocol ("DHCP"). The wireless device 106 is assigned to a specific P-CSCF 206 for the duration of the device's subscription to the IMS network. All signaling messages are intercepted by the P-CSCF 206, allowing the P-CSCF 206 to inspect the messages. The P-CSCF 206 authenticates the wireless device 106 and is trusted by the other IMS components, which therefore do not perform further authentication of the wireless device 106. For example, after successful registration of a wireless device 106 with the S-CSCF 210, security keys are sent to the P-CSCF 206, which allows it to setup a security association with the wireless device 106. The P-CSCF 206 can authenticate subsequent messages, allowing the other network entities such as the I-CSCF 208 and S-CSCF 210 to trust the messages. Other functions of the P-CSCF 206 should be known to those of ordinary skill in the art.

Regarding the I-CSCF 208, the IP address of the I-CSCF 208 is published in the domain name system ("DNS") of the domain. This allows for remote servers such as a P-CSCF 206 residing in a visited domain or the S-CSCF 210 in a foreign domain to locate the I-CSCF 208. The remote servers use the I-CSCF 208 as an entry point for all SIP packets to the domain where the I-CSCF is located. The I-CSCF 208 retrieves the location of the wireless device 106 so that a SIP request associated with the device 106 can be routed to the S-CSCF 210 assigned to the device 106. The I-CSCF 208 is an IMS entry point from other external networks.

The S-CSCF 210 performs session control. The S-CSCF 210 is located in the home network of the wireless device 106. The S-CSCF 210 retrieves device profiles from the HSS 212. The S-CSCF 210 also handles SIP registrations which allows the S-CSCF 210 to bind the location of the wireless device 106 (e.g., the IP address of the device) and the SIP address. The S-CSCF 210 can intercept all of the signaling messages in the IMS so that it can inspect each message.

IMS network 214 further includes one or more application servers (ASs) 218 (one shown). The S-CSCF 210 determines which application server, such as application server ("AS") 218, to forward the SIP message associated with the wireless device 106 so that the services subscribed to by the wireless device can be provided. ASs such as AS 218 host and execute various services subscribed to by a wireless device 106. For example, ASs such as AS 218 can provide services such as call waiting, call forwarding, call conferencing, voice mail, SMS, MMS, and the like to a wireless device.

As discussed above, the HSS 212 includes profiles associated with wireless devices, such as the service profile 220 and the wireless device 106, registered within the IMS network 214. Each profile, among other things, identifies the application servers 218 associated with the corresponding wireless device. In other words, a service profile, such as service profile 220, identifies one or more ASs, such as AS 218, that need to be notified when a wireless device registers with the IMS network 214.

In one embodiment, the S-CSCF 210 includes a registration manager 222 for managing IMS registration of wireless devices 106. The wireless device 106 registers with the IMS network 214 by sending a REGISTER message to the S-CSCF 210. The S-CSCF 210 then retrieves the profile 220 associated with the wireless device 106 from the HSS 212. The S-CSCF 210 analyzes the retrieved profile 220 to determine, among other things, any application servers 218 that need to be notified of the registration by the wireless device 106. These application servers 218, in one embodiment, are notified by the S-CSCF 210 via a third-party registration message.

As discussed above, prior art IMS systems only notify an application server that an associated wireless device has registered with a corresponding IMS network. Additional information such as P-access-network-id, User-Agent, capabilities, preferences, manufacturer, software version, contact (i.e., IP address), private id (e.g., IMSI from a SIM card and the like that is sent by a wireless device in a REGISTER message to an S-CSCF is not passed along to the ASs). This additional information may be needed by an AS in order to provide the proper service to the wireless device. For example, by providing the additional information provided by the wireless device 106 in the REGISTER message to the S-CSCF 210, communication system 100 permits ASs such as AS 218, using different parameters per Access Network, to perform different services depending on the capabilities of the wireless device, such as billing services requiring roaming information, emergency services, and the like.

Therefore, in one embodiment, communication system 100 provides this additional information sent by the wireless device 106 to a requesting AS 218. The AS 218 communicates with the HSS 212 to notify the HSS 212 of what dynamic information the AS requires for providing services to the wireless device 106. Dynamic information, in one embodiment, encompasses information transmitted to the S-CSCF 210 by the wireless device 106 during an original REGISTER message. In other words, information such as P-access-network-id, User-Agent, equipment, capabilities, and the like are transmitted from the wireless device 106 to the P-CSCF 210. In one embodiment, AS 218 communicates a "command template" 224 to the HSS 212, which template identifies, or is stored in association with, the AS. The command template 224 can be a form that identifies particular information requested by the AS 218. In other words, the AS 218 indicates, via the command template, what information received in a REGISTER message from a wireless device the AS requires to perform specific services for the wireless device.

In one embodiment, AS 218 provides to the HSS 212 the command template 224. The HSS 212 then stores the command template as part of the profile associated with a particular wireless device, such as service profile 220 and wireless device 106. When the S-CSCF 210 receives a REGISTER message from the wireless device 106, the registration manager 222 of the S-CSCF 210 retrieves the service profile 220 associated with the wireless device 106. The service profile 220 includes service information for each AS, such as AS 218, associated with the wireless device 106, including the command template 224 provided by AS 218. This service information can include tags that indicate, to the S-CSCF 210 and per the command template 224, what headers received in a REGISTER message from the wireless device 106 to include in the service-information body of the third party registration message conveyed to the AS 218. As the REGISTER message from the wireless device 106 may be network 102, 104 specific, so may the information requested by the AS be network, or header, specific. As part of the service-information provisioning in the HSS 212 for that Initial Filter Criteria ("IFC") as defined in the 3GPP standard TS23.218, which is hereby incorporated by reference in its entirety. An IFC is a set of triggers and actions (e.g., forward message to the AS) to be executed by the S-CSCF 210 for a particular user upon reception of a request message (REGISTER, INVITE, and the like) from that user.

Once the S-CSCF 210 receives the service profile and executes the iFC for a particular wireless device and a particular AS, such as the wireless device 106 and the AS 218, the S-CSCF 210 determines if any tags are present. If so, the S-CSCF 210 includes, as part of a service-information body, the headers in the original REGISTER message from the wireless device, that is, wireless device 106 as requested by the AS, that is, AS 218, in that tag. In other words, the S-CSCF 210 processes a command template 224 received in a service profile for the wireless device 106 and associated with the AS 218. As a result, the dynamic information request by the AS 218 via the command template 224 is included, by the S-CSCF 210, in the third party registration message. This third party registration message is then transmitted to the AS 218. In one embodiment, the S-CSCF 210 creates an XML file from the command template 224 that includes the information requested by the AS 218. The XML format and type is further defined in the 3GPP specification TS24.229, which is hereby incorporated by reference in its entirety.

One advantage of the present invention is that the AS 218 can indicate to the S-CSCF 210 the dynamic information that the AS requires from the original REGISTER message sent by a particular wireless device, such as the wireless device 106. The AS 218 can determine what information the AS requires and store an indication of, that is, a request for, the required information at a register such as an HSS 212. The present invention allows for dynamic information such as wireless device capabilities, wireless device status, network status, network capabilities, and the like to be requested by and transmitted to an AS 218. Current IMS systems only allow for predefined static information stored at a HSS 212 to be sent to an AS 218. The present invention, however, allows for the dynamic information provided by a wireless device 106 to be sent to an AS 218 via the third party registration messaging protocol.

Signal Flow Diagram for Third Party Registration Including Dynamic Information

Figure 3:
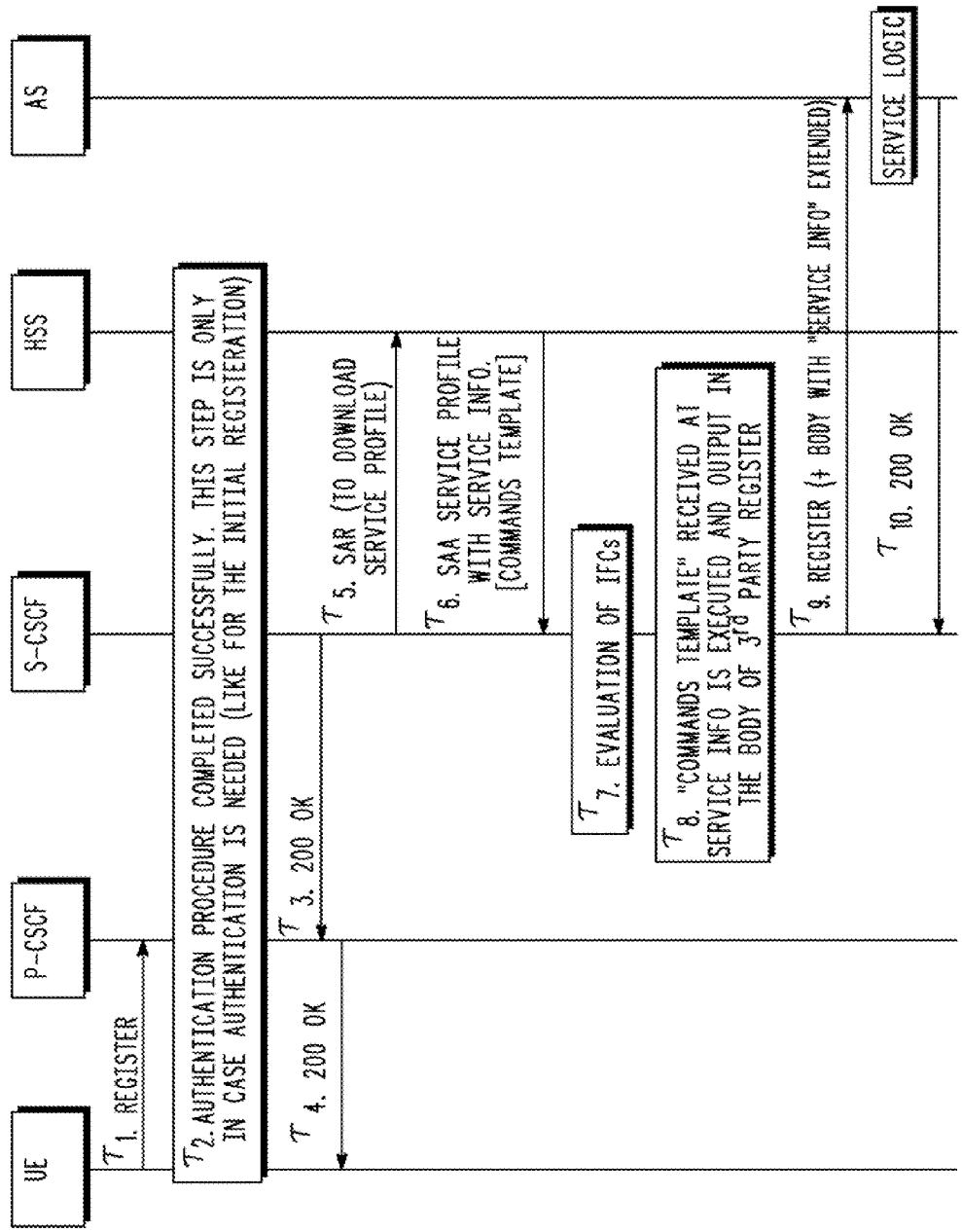
FIG. 3 is a signal flow diagram for sending dynamic wireless device information to an application server via a third party registration message according to an embodiment of the present invention.

FIG. 3 is a signal flow diagram illustrating a providing of a third party registration message to the AS 218 that includes dynamic information requested by the AS according to an embodiment of the present invention. At time $T_1$, the wireless device 106 registers with the IMS network 214 by sending a REGISTER message to the P-CSCF 206, and the P-CSCF notifies the S-CSCF 210 of the registration. If the wireless device 106 is registering for a first time, an authentication procedure is performed at time $T_2$. At time $T_3$, the S-CSCF 210 replies to the P-CSCF 206 with a 200 OK response message indicating that the registration has been successful. At time $T_4$, the P-CSCF 206 forwards the response message from the S-CSCF 210 to the wireless device 106.

At time $T_5$, the S-CSCF 210 sends a Service-Assignment-Request ("SAR") message to the HSS 212 to set a status of the wireless device 106 as registered and to download the corresponding service profile for that wireless device 106. At time $T_6$, the HSS 218 sets the state of the wireless device 106 as registered and replies to the S-CSCF 210 by sending a Service-Assignment-Answer ("SAA") message that includes a service profile associated with the wireless device as stated in the 3GPP specification TS29.228, which is hereby incorporated by reference in its entirety. However, unlike in the prior art, the service profile 220 provided by HSS 212 further includes a command template 224 that identifies information requested by the AS 218. The command template 224 is to be processed by the S-CSCF 210 and sent in the body of a third party registration message to the requesting AS 218. A SAR/SAA request message can be sent over a Cx interface (e.g., between the S-CSCF 210 and HSS 218) to set the user state as register/de-register in the HSS 218 and download the service profile 220 from the HSS 218 to the S-CSCF 216. The SAR and SAA messages discussed in greater the 3GPP standard publication TS 29.228, which is hereby incorporated by reference in its entirety.

At time $T_7$, the S-CSCF 210 executes all the iFCs and when a match happens, the S-CSCF 210 builds up a new REGISTER message. At time $T_8$, the S-CSCF 210 executes the command template 224 received as part of the service information and, in executing the command template, provides dynamic information requested by the AS 218. For example, the S-CSCF 210, based on the command template 224, can retrieve appropriate wireless device and network status and/or capacity information. At time $T_9$, the S-CSCF 210 builds a third party REGISTER request message and conveys the third party REGISTER request message to the AS 218. REGISTER request messages and their transmission are further discussed in the 3GPP specification TS24.229, section 5.4, which is hereby incorporated by reference in its entirety.

Preferably, the S-CSCF 210 includes the output of the execution of the command template 224 in the body of the third party register message using proper XML extensions. The AS 218 receives the third party registration message and if reception of the message is successful, the AS 218 replies, at time $T_{10}$, with a 200 OK message confirming the success of the registration process also in the AS 218.

Exemplary Wireless Device

Figure 4:
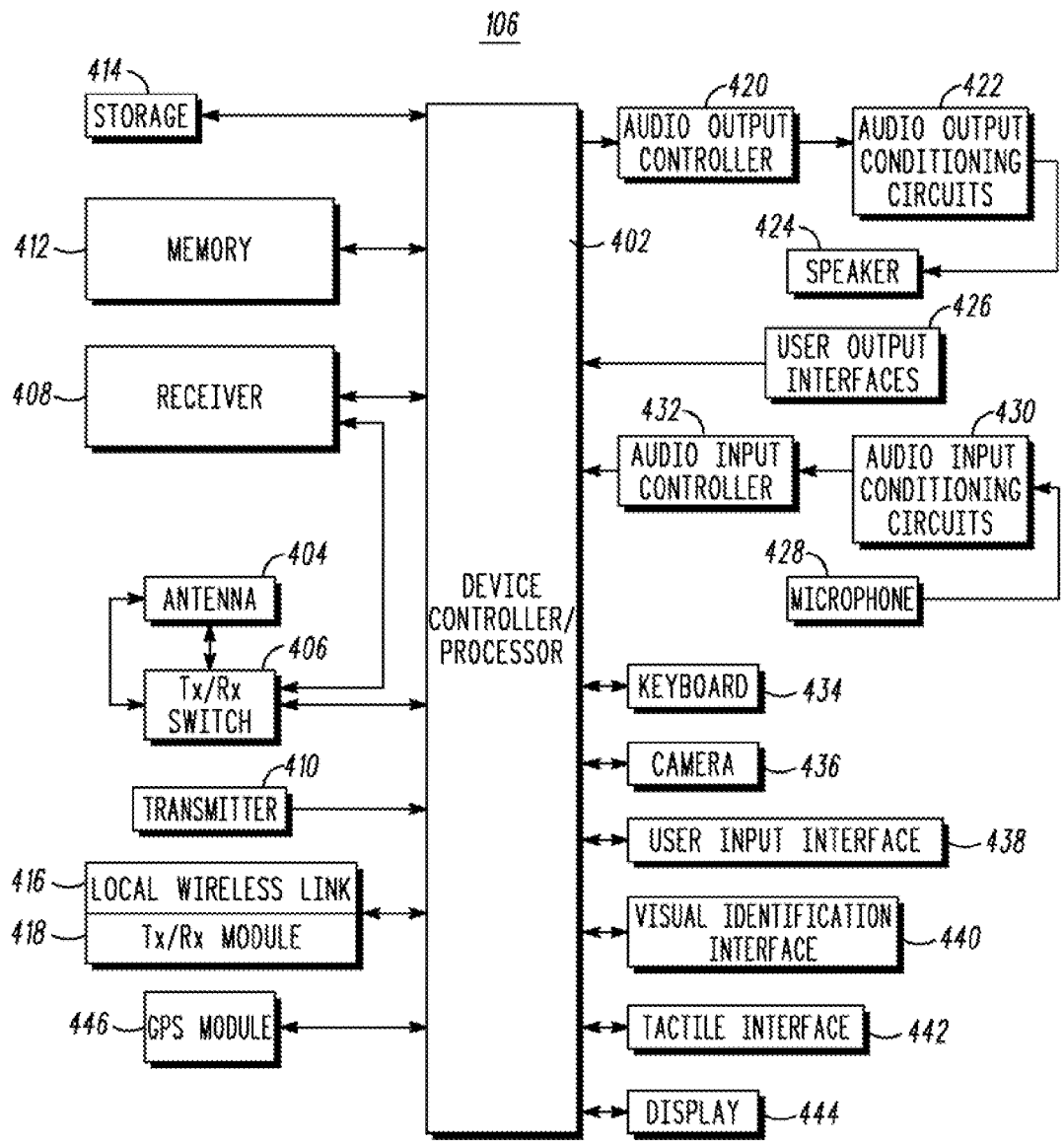
FIG. 4 is a block diagram illustrating a wireless device according to an embodiment of the present invention.

FIG. 4 is a block diagram illustrating a more detailed view of the wireless device 106. In one embodiment, the wireless device 106 is a dual mode device capable of communicating on either the packet data network 102 or the circuit services network 104. The wireless device 106 operates under the control of a device controller/processor 402, that controls the sending and receiving of wireless communication signals. In receive mode, the device controller 402 electrically couples an antenna 404 through a transmit/receive switch 406 to a receiver 408. The receiver 408 decodes the received signals and provides those decoded signals to the device controller 402.

In transmit mode, the device controller 402 electrically couples the antenna 404, through the transmit/receive switch 406, to a transmitter 410. The device controller 402 operates the transmitter and receiver according to instructions stored in the memory 412. These instructions include, for example, a neighbor cell measurement-scheduling algorithm.

The wireless device 106 also includes non-volatile storage memory 414 for storing, for example, an application waiting to be executed (not shown) on the wireless device 106. The wireless device 106, in this example, also includes an optional local wireless link 416 that allows the wireless device 106 to directly communicate with another wireless device without using the wireless network 102. The optional local wireless link 416, for example, is provided by Bluetooth, Infrared Data Access (IrDA) technologies, or the like. The optional local wireless link 416 also includes a local wireless link transmit/receive module 418 that allows the wireless device 106 to directly communicate with another wireless device.

The wireless device 106 of FIG. 4 further includes an audio output controller 420 that receives decoded audio output signals from the receiver 408 or the local wireless link transmit/receive module 418. The audio controller 420 sends the received decoded audio signals to the audio output conditioning circuits 422 that perform various conditioning functions. For example, the audio output conditioning circuits 422 may reduce noise or amplify the signal. A speaker 424 receives the conditioned audio signals and allows audio output for listening by a user. The audio output controller 420, audio output conditioning circuits 422, and the speaker 424 also allow for an audible alert to be generated notifying the user of a missed call, received messages, or the like. The wireless device 106 further includes additional user output interfaces 426, for example, a head phone jack (not shown) or a hands-free speaker (not shown).

The wireless device 106 also includes a microphone 428 for allowing a user to input audio signals into the wireless device 106. Sound waves are received by the microphone 428 and are converted into an electrical audio signal. Audio input conditioning circuits 430 receive the audio signal and perform various conditioning functions on the audio signal, for example, noise reduction. An audio input controller 432 receives the conditioned audio signal and sends a representation of the audio signal to the device controller 302.

The wireless device 106 also comprises a keyboard 434 for allowing a user to enter information into the wireless device 106. The wireless device 106 further comprises a camera 436 for allowing a user to capture still images or video images into memory 412. Furthermore, the wireless device 106 includes additional user input interfaces 438, for example, touch screen technology (not shown), a joystick (not shown), or a scroll wheel (not shown). In one embodiment, a peripheral interface (not shown) is also included for allowing the connection of a data cable to the wireless device 106. In one embodiment of the present invention, the connection of a data cable allows the wireless device 106 to be connected to a computer or a printer.

A visual notification (or indication) interface 440 is also included on the wireless device 106 for rendering a visual notification (or visual indication), for example, a sequence of colored lights on the display 444 or flashing one or more LEDs (not shown), to the user of the wireless device 106. For example, a received multimedia message may include a sequence of colored lights to be displayed to the user as part of the message. Alternatively, the visual notification interface 440 can be used as an alert by displaying a sequence of colored lights or a single flashing light on the display 444 or LEDs (not shown) when the wireless device 106 receives a message, or the user missed a call.

The wireless device 106 also includes a tactile interface 442 for delivering a vibrating media component, tactile alert, or the like. For example, a multimedia message received by the wireless device 106 may include a video media component that provides a vibration during playback of the multimedia message. The tactile interface 442, in one embodiment, is used during a silent mode of the wireless device 106 to alert the user of an incoming call or message, a missed call, or the like. The tactile interface 442 allows this vibration to occur, for example, through a vibrating motor or the like.

The wireless device 106 also includes a display 444 for displaying information to the user of the wireless device 106. An optional Global Positioning System (GPS) module 446 is used to determine the location and/or velocity information of the wireless device 106. This module 446 uses the GPS satellite system to determine the location and/or velocity of the wireless device 106. Alternative to the GPS module 446, the wireless device 106 may include alternative modules for determining the location and/or velocity of wireless device 106, for example, using cell tower triangulation and assisted GPS, using accelerometers in the wireless device 106, and other devices and techniques as are known to those of ordinary skill in the art.

Exemplary Information Processing System

Figure 5:
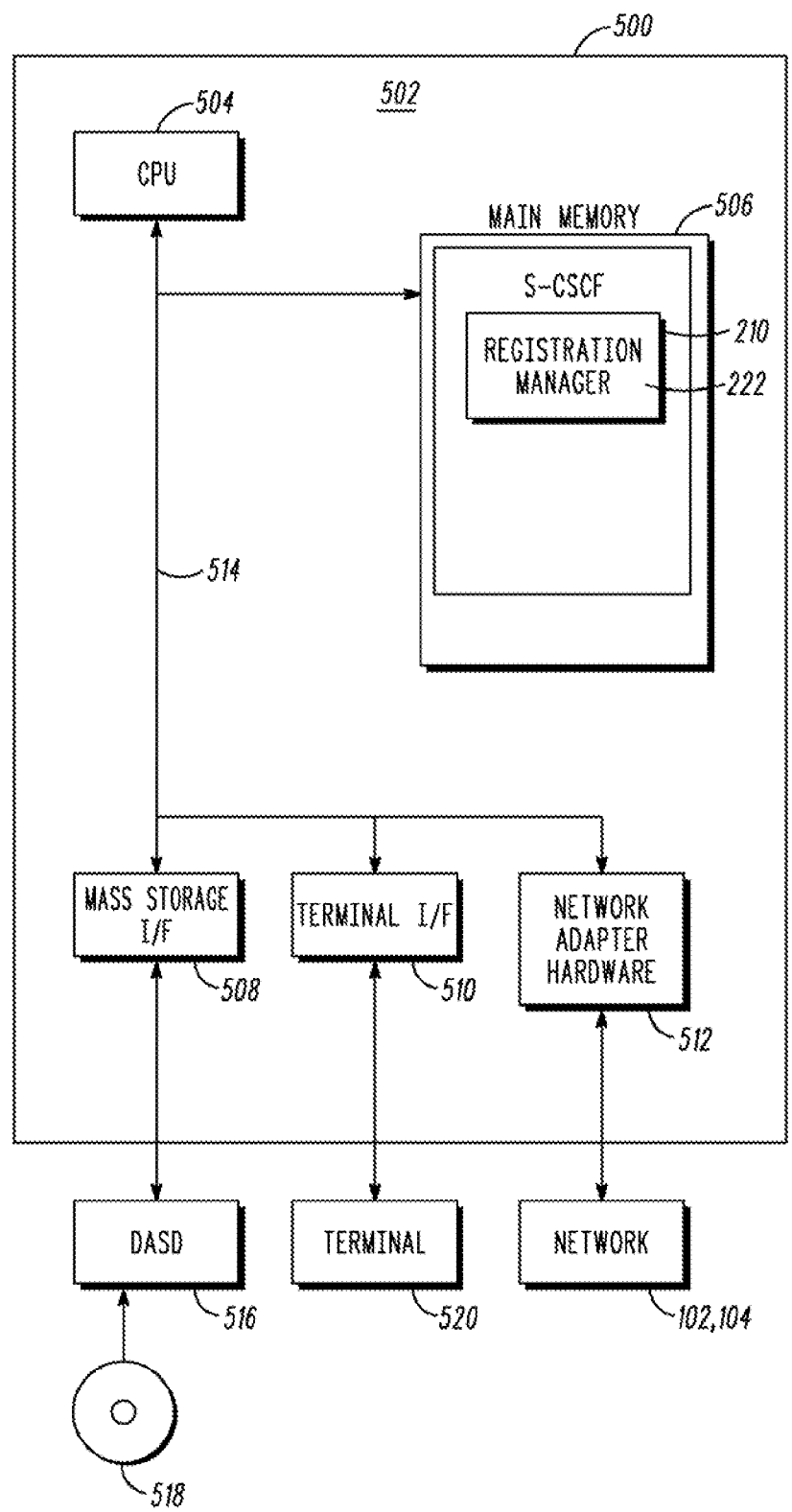
FIG. 5 is a block diagram illustrating an information processing system according to an embodiment of the present invention.

FIG. 5 is a block diagram illustrating a detailed view of an information processing system 500 according to an embodiment of the present invention. The information processing system 500 of FIG. 5 is an information processing system including the S-CSCF 210. The information processing system 500 may also include additional network components which are not shown for simplicity. The information processing system 500 is based upon a suitably configured processing system adapted to implement the exemplary embodiment of the present invention. Any suitably configured processing system is similarly able to be used as the information processing system 500 by embodiments of the present invention. For example, a personal computer, workstation, or the like, may be used.

The information processing system 500 includes a computer 502. The computer 502 has a processor 504 that is connected to a main memory 530, a mass storage interface 508, a terminal interface 510, and network adapter hardware 512. A system bus 514 interconnects these system components. The mass storage interface 508 is used to connect mass storage devices such as data storage device 516 to the information processing system 500. One specific type of data storage device is a computer readable medium such as a CD drive, which may be used to store data to and read data from a CD 518. Another type of data storage device is a data storage device configured to support New Technology File System ("NTFS") operations, UNIX operations, or the like.

In one embodiment, the main memory 530 includes an S-CSCF module 532 comprising programs and data that are executed by the processor 504 and permit the information processing system 500 to implement the functionality of the S-CSCF 206. The S-CSCF module 532 includes a registration manager module 534 that permits the information processing system 500 to implement the registration manager 222 of the S-CSCF as discussed above. It should be noted that respective components of the main memory 530 are not required to be completely resident in the main memory 530 at all times or even at the same time. In one embodiment, the information processing system 500 utilizes conventional virtual addressing mechanisms to allow programs to behave as if they have access to a large, single storage entity, referred to herein as a computer system memory, instead of access to multiple, smaller storage entities such as the main memory 530 and data storage device 516. Note that the term "computer system memory" is used herein to generically refer to the entire virtual memory of the information processing system 500.

Although only one processor 504 is illustrated for computer 502, computer systems with multiple processors can be used equally effectively. Embodiments of the present invention further incorporate interfaces that each includes separate, fully programmed microprocessors that are used to off-load processing from the processor 504. Terminal interface 510 is used to directly connect one or more terminals 520 to computer 502 to provide a user interface to the information processing system 500. These terminals 520, which are able to be non-intelligent or fully programmable workstations, are used to allow system administrators and users to communicate with the information processing system 500. The terminal 520 is also able to consist of user interface and peripheral devices that are connected to computer 502 and controlled by terminal interface hardware included in the terminal I/F 510 that includes video adapters and interfaces for keyboards, pointing devices, and the like.

An operating system (not shown) included in the main memory is a suitable multitasking operating system such as the Linux, UNIX, Windows XP, and Windows Server 2005 operating system. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 500.

The network adapter hardware 512 is used to provide an interface to the packet data network 102 and the circuit services network 104. Embodiments of the present invention are able to be adapted to work with any data communications connections including present day analog and/or digital techniques or via a future networking mechanism. Although the exemplary embodiments of the present invention are described in the context of a fully functional computer system, those skilled in the art will appreciate that embodiments are capable of being distributed as a program product via CD, e.g, CD 518, floppy-disk, or other form of recordable media, or via any type of electronic transmission mechanism.

Figure 6:
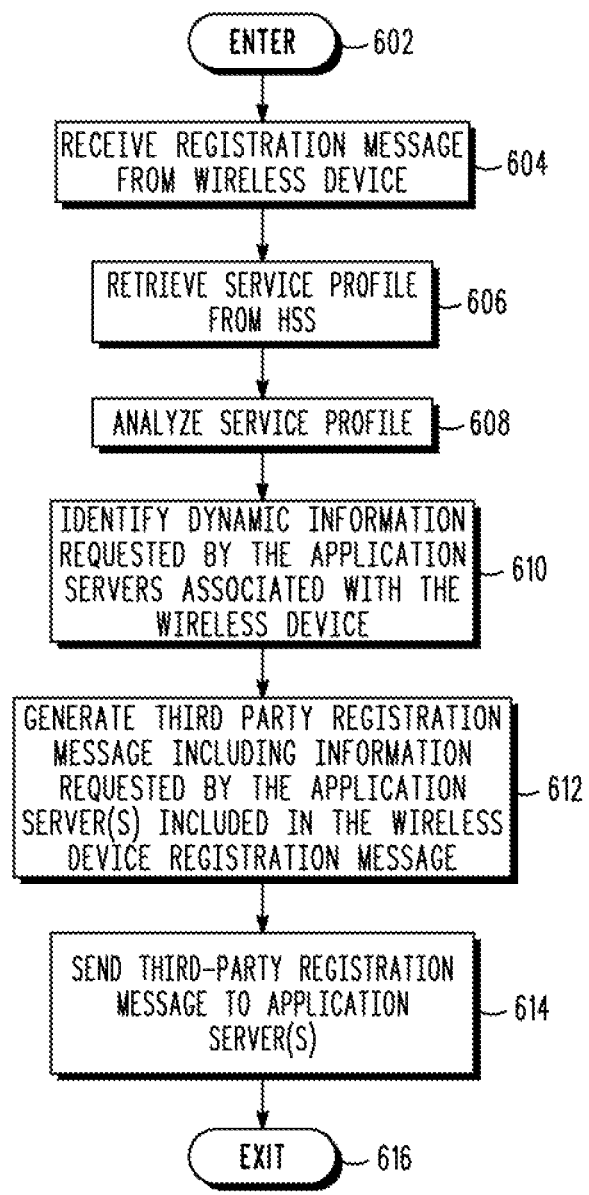
FIG. 6 is an operational flow diagram illustrating an exemplary process transmitting dynamic wireless device information to an application server, according to an embodiment of the present invention.

Exemplary Process of a Transmitting of Dynamic Wireless Device Information to an Application Server FIG. 6 is an operational flow diagram illustrating an exemplary process transmitting dynamic wireless device information to an AS, such as AS 218. The operational flow diagram of FIG. 6 begins at step 602 and flows directly to step 604. The S-CSCF 210, at step 604, receives a registration message from the wireless device 106. This message includes various information associated with the wireless device 106. The S-CSCF 210, at step 606, retrieves the service profile 220 associated with the wireless device 106 from the HSS 212. At step 608, the S-CSCF 210 analyzes the service profile 220.

The S-CSCF 210, at step 610, identifies dynamic wireless device information requested by AS 218. For example, the service profile 220 can includes tags or a command template that indicates information requested by AS 218 that was transmitted by the wireless device 106 to the S-CSCF 210 in the registration message. The S-CSCF 210, at step 612, generates a third party registration message that includes the requested information. In one embodiment, the requested information is in an XML format that is readable by the requesting AS 218. The third party registration message, at step 614, is then sent to the requesting AS 218. The operational flow then ends at step 616.

Figure 7:
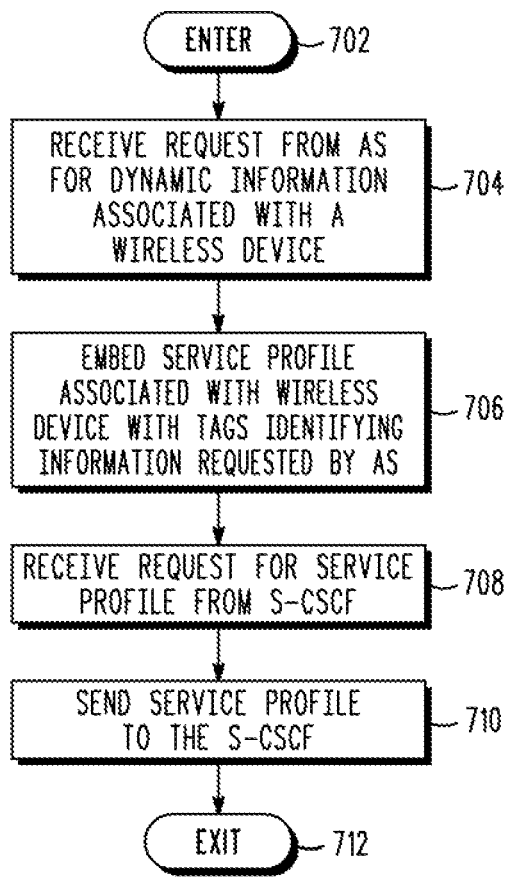
FIG. 7 is an operational flow diagram illustrating an exemplary process embedding dynamic information request from an application server(s) into a service profile according to an embodiment of the present invention.

Exemplary Process of Embedding Dynamic Information Requests in a Service Profile FIG. 7 is an operational flow diagram illustrating an exemplary process of embedding dynamic information request from the AS 218, into the service profile 220, according to an embodiment of the present invention. The operational flow diagram of FIG. 7 begins at step 702 and flows directly to step 704. The HSS 212, at step 704, receives a request from AS 218 for dynamic information associated with a particular wireless device, that is, the wireless device 106.

For example, the AS 218, in one embodiment, transmits a command template 224 to the HSS 212, as discussed above. The HSS 212, at step 706, embeds the information request (e.g., the command template 224) into the service profile 220 associated with the wireless device 106. The HSS 212, at step 708, receives a request for the service profile 220 from the S-CSCF 210. The HSS 212, at step 710, sends the service profile 220 to the S-CSCF 210. The control flow then ends at step 712.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method comprising:

receiving, by a Serving Call Session Control Function (S-CSCF) module executing on an information processing system comprising one or more computers communicating on an Internet Protocol Multimedia Subsystem network, a registration message associated with a wireless device;

retrieving, by the S-CSCF, a service profile associated with the wireless device from a Home Subscriber Server for the Internet Protocol Multimedia Subsystem network;

determining, by the S-CSCF, that the service profile comprises a command template provided by at least one application server associated with the wireless device, wherein the command template specifies requested wireless device capability information to be used by the application server and a format for the requested wireless device capability information;

generating, by the S-CSCF, a third-party registration message including adding, to the body of the third-party registration message, the requested wireless device capability information for the wireless device using the registration message and formatting the requested wireless device capability information using the format of the command template; and sending, by the S-CSCF, the third party registration message to the at least one application server.

2. The method of claim 1, wherein the command template includes Extensible Markup Language tags for indicating a set of dynamic information requested by the at least one application server.

3. The method of claim 2, wherein the generating further comprises:
retrieving dynamic information indicated by the command template; and
formatting the dynamic information within the third-party registration message in an Extensible Markup language format indicated by the command template.

4. An information processing system in an Internet Protocol Multimedia Subsystem network for providing dynamic information associated with at least one of a wireless device and a network to at least one application server, the information system comprising:
a processor; and
a memory communicatively coupled to the processor and comprising a Serving Call Session Control Function module that is adapted to:
receive a registration message associated with a wireless device;
retrieve a service profile associated with the wireless device from a Home Subscriber Server for the Internet Protocol Multimedia Subsystem network;
determine that the service profile comprises a command template provided by at least one application server associated with the wireless device, wherein the command template specifies requested wireless device capability information to be used by the application server and a format for the requested wireless device capability information;
generate a third-party registration message including adding, to the body of the third-party registration message, the requested wireless device capability information for the wireless device using the registration message and formatting the requested wireless device capability information using the format of the command template;
and
send the third-party registration message to the at least one application server.

5. The information processing system of claim 4, wherein the command template is associated with the at least one application server and includes Extensible Markup Language tags for indicating a set of dynamic information requested-by the at least one application server.

6. The information processing system of claim 5, wherein the generating further comprises:
retrieving dynamic information indicated by the command template; and
formatting the dynamic information within the third-party registration message in an Extensible Markup language format indicated by the command template.

7. The information processing system of claim 4, wherein the dynamic information is transmitted by the wireless device in the registration message.

8. A wireless communication systems comprising:
a base station;
a wireless device that is communicatively coupled to the base station; and
an Internet Protocol Multimedia Subsystem network comprising at least one information processing system, wherein the information processing system includes at least a Serving Call Session Control Function module that is adapted to:
receive a registration message associated with a wireless device;
retrieve a service profile associated with the wireless device from a Home Subscriber Server for the Internet Protocol Multimedia Subsystem network;
determine that the service profile comprises a command template provided by at least one application server associated with the wireless device, wherein the command template specifies requested wireless device capability information to be used by the application server and a format for the requested wireless device capability information;
generate a third-party registration message including adding, to the body of the third-party registration message, the requested wireless device capability information for the wireless device using the registration message and formatting the requested wireless device capability information using the format of the command template;
and
send the third-party registration message to the at least one application server.

9. The wireless communications system of claim 8, wherein the command template is associated with the at least one application server and includes Extensible Markup Language tags for indicating a set of dynamic information requested by the at least one application server.

10. The wireless communications system of claim 9, wherein the generating further comprises:
retrieving dynamic information indicated by the command template; and
formatting the dynamic information within the third-party registration message in an Extensible Markup language format indicated by the command template.

11. The wireless communication system of claim 8, wherein the dynamic information is transmitted by the wireless device in the registration message.

* * * * *